Figure 1:
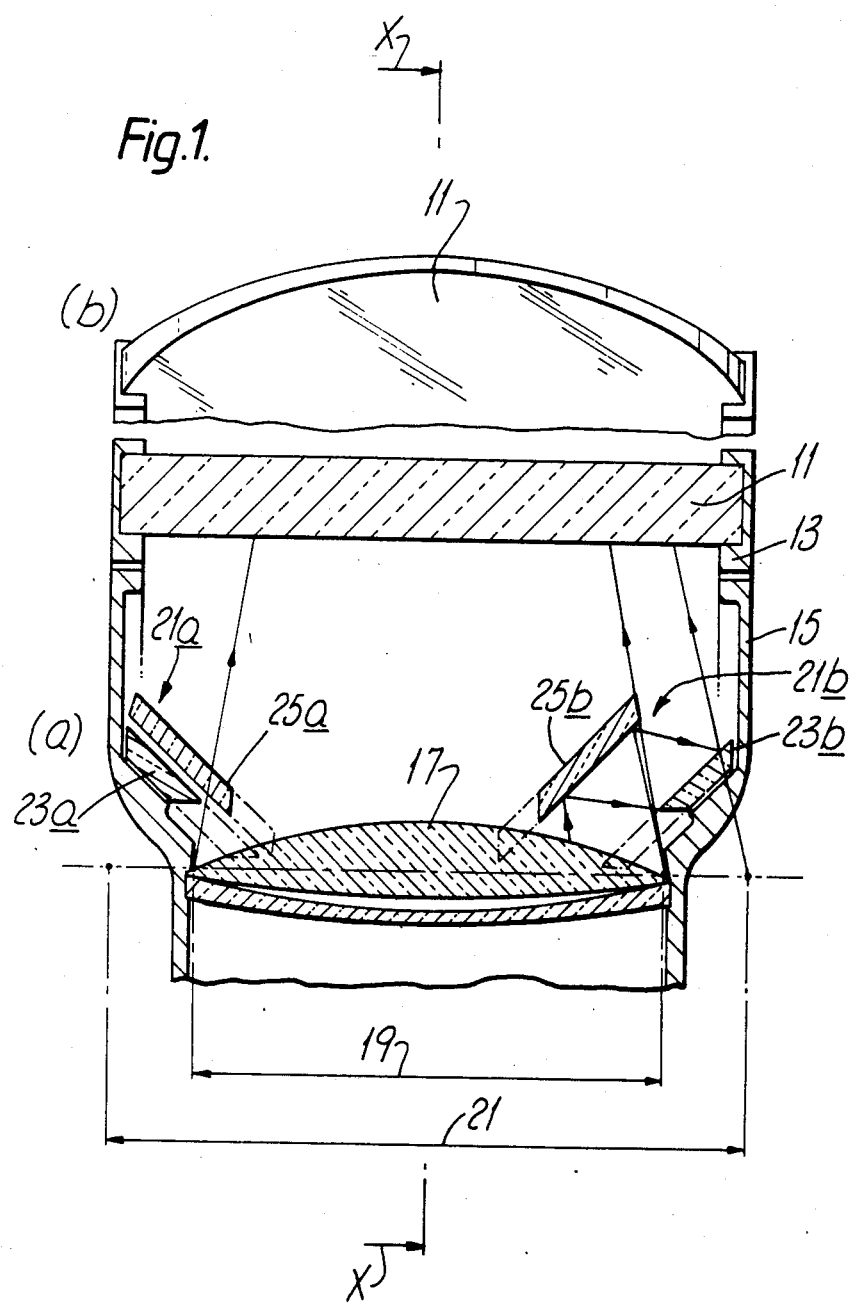

United States Patent [19]

Ellis

[11] 4,385,803
[45] May 31, 1983

[54] DISPLAY UNITS WITH PERISCOPIC ARRANGEMENT

[75] Inventor: Stafford M. Ellis, West Sussex, England

[73] Assignee: Elliott Brothers (London) Limited, Chelmsford, England

[21] Appl. No.: 260,401

[22] Filed: May 4, 1981

[30] Foreign Application Priority Data

May 19, 1980 [GB] United Kingdom ............... 8016480

[51] Int. Cl.³ .................................................. G02B 27/10
[52] U.S. Cl. ..................................................... 350/174
[58] Field of Search .................. 350/174, 169, 170–173

[56] References Cited

U.S. PATENT DOCUMENTS 3,816,005  6/1974  Kirschner ............................ 350/174
4,111,527  9/1978  Cojah ................................... 350/174

Primary Examiner—Jon W. Henry
Attorney, Agent, or Firm—Kirschstein, Kirschstein, Ottinger & Cobrin

[57] ABSTRACT

A display unit for a head-up display system which includes a periscopic arrangement 21a,b at each side of the exit pupil 19 of an optical projector. This arrangement is effective to direct collimated light to a conventional monocombiner 11, from lateral portions of the display which otherwise would not be received by the observer without head movement. It thereby increases the observer's instantaneous azimuth field of view of the display.

5 Claims, 3 Drawing Figures

DISPLAY UNITS WITH PERISCOPIC ARRANGEMENT

This invention relates to display units for head-up display systems.

The display unit of a head-up display system comprises a projector for projecting light representing a display onto a combiner for reflection thereby to provide an observer with an image of the display superimposed on his view of the distant scene through the combiner. The projector normally incorporates a collimating system so that the observer is presented with a virtual image of the display at infinity.

The rays of light leaving the projector are necessarily confined to a definite area known as an exit pupil, normally defined by the final lens of the projector optical system by which the display light leaves the projector housing. This exit pupil and the observer's eye position with respect to the combiner and, hence, the porthole or virtual image of the exit pupil produced by the combiner, determine the instantaneous field of view (IFOV) available at that eye position.

The call is for a large IFOV; typically it may be required that the IFOV shall be 20° in azimuth and, say, 15° in elevation from a defined design eye position whilst fitting into the, generally limited, space available, and, for units for use in military aircraft, not intruding beyond a defined pilot ejection line.

The problems are aggravated by demands for yet greater IFOVs for use in bad natural visibility conditions, e.g. at night. Whilst 20° azimuth IFOV is generally more than adequate for day conditions, at night and in poor visibility using, for example, infra red (i.r.) or low-light television (LLTV) sensors and projecting a raster scanned image of the forward scene to the observer using the display system the observers knowledge of the distant scene is confined to whatever is presented to him in the available IFOV. In day conditions the forward scene to each side of the display system combiner is of course visible, in poor visibility, the IFOV of the display unit is the entire source of information.

To achieve larger azimuth IFOV's, attention has recently been given to the use of combiners fabricated using diffractive optic coatings—so called holographic coatings. And whilst azimuth IFOV's of up to 30° and more are achievable using such techniques such combiners and associated connecting optics are expensive and still involve practical technical problems. Thus it is an object of the present invention to provide a display unit for a head-up display system wherein increased IFOV is obtained without the use of such a combiner.

According to the present invention, in a display unit for a head-up display system comprising a projector for projecting light representing a display onto a combiner for reflection thereby to provide an observer with an image of the display superimposed on his view of the distant scene through the combiner, there is provided adjacent an element defining the exit pupil of the projector a periscopic arrangement comprising a first reflective element and a second parallel element possessing both light transmissive and light reflective properties, the said periscopic arrangement being effective by successive reflections at the said second element and the first element to transmit to the combiner light from lateral portions of the exit pupil which otherwise would not be received by the observer without lateral head movement.

Preferably said elements are crescent shaped.

Since the display unit may employ a conventional combiner and use conventional technology it presents no special technical problems.

Preferably said second element is movable between a first position wherein the periscopic arrangement is operative and a second position wherein the periscopic arrangement is inoperative.

Normally two such periscopic arrangements are provided on opposite sides of the element defining the exit pupil of the projector.

Figure 2:
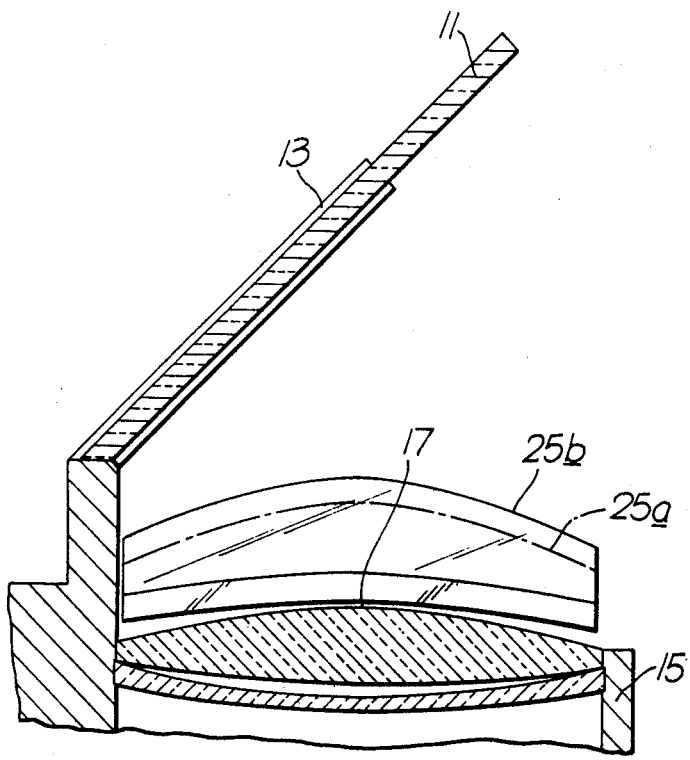
Figure 3:
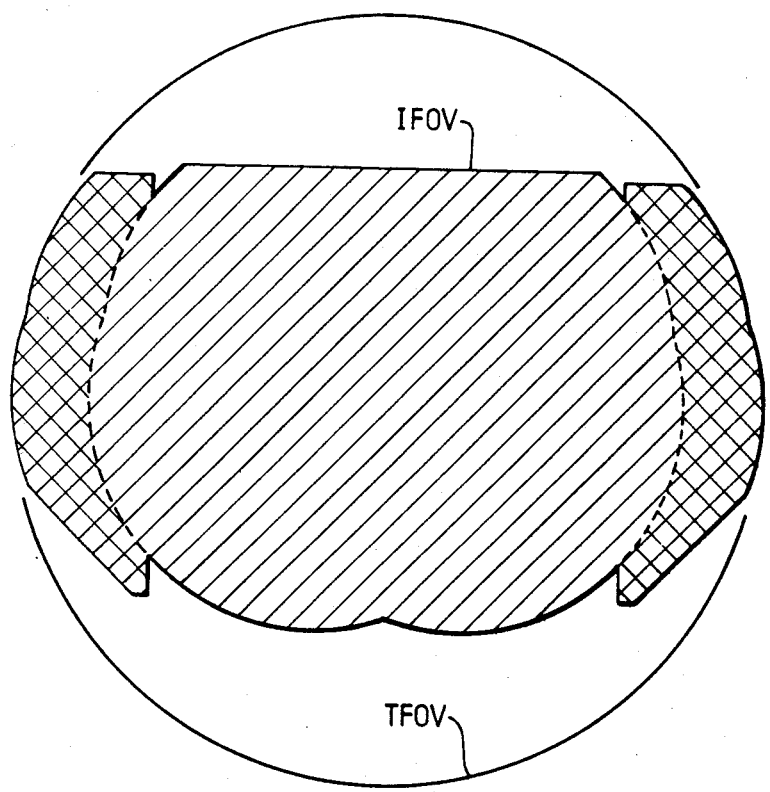

One display unit in accordance with the invention will now be described by way of example with reference to the accompanying drawings in which:

FIG. 1 is a composite drawing depicting at (a) a front vertical section through the display unit viewed from an observers position and, at (b), a perspective view of the upper part of the unit, FIG. 2 is a cross-sectional view along the line XX' in FIG. 1; and FIG. 3 is a diagram showing the instantaneous fields of view (IFOV'S) available using the display unit of FIG. 1 at the observers eye position.

Referring to FIGS. 1 and 2, the unit includes a combiner 11 which is supported between two side members 13 extending upwardly from a housing 15 which contains a projector (not visible) which projects light representing a display onto the combiner 11.

The combiner 11 is of the type known as a monocombiner, that is to say it consists simply of a plane glass sheet with a semi-reflective film on its surface nearer the observer. The combiner is angled with respect to the optical axis of light leaving the projector so as to reflect display light towards the observer, whilst at the same time allowing light from the distant scene to pass through the combiner to the observer.

The projector includes a collimating system so that the image of the display presented to the observer appears to be at infinity. The final lens 17 of the collimating system which is symmetrically truncated in the fore and aft direction as viewed in FIG. 1 defines the exit pupil of the projector, indicated by line 19 in FIG. 1.

The unit further includes two periscopic arrangements 21a, 21b located on opposite lateral sides of the lens 17.

Each arrangement 21a, 21b comprises a crescent shaped plane fully reflective element 23a or 23b fixed with respect to the housing 15 and a parallel crescent shaped element 25a or 25b which has both light transmissive and light reflective properties and which is movable between an operative position, as shown on the right hand side in FIG. 1 and a retracted or stowed position as shown on the left hand side in FIG. 1. The elements 25a, 25b are movable by means of mechanism (not shown) common to both elements 25a, 25b and operative to produce motion of the elements 25a, 25b in unison towards or away from their associated fixed full reflectors 23a, 23b, respectively.

The mechanism is suitably a parallel motion arrangement similar to that commonly employed with draughtsman's drawing boards; but many other suitable mechanisms are available and the choice of the mechanism is in practice a matter for detailed consideration and design.

As indicated in FIG. 1 by the light ray lines, by double reflection at the side periscopic arrangements the azimuth instantaneous field of view available to the observer is increased when the elements 25a, 25b are in the operative position, the effective exit pupil then being as indicated by line 21 in FIG. 1. At night or in other bad visibility conditions where for example an i.r. representation of the forward terrain is projected to the observer one would employ the larger azimuth IFOV; in daylight the retracted position may be preferred since there may be some shading at the edges of the IFOV with the elements 25a, 25b of the periscopic arrangements at their operative positions.

The elements 25a, 25b, may of course, be fixed in the operative position. Diffractive optical coatings may be used to mitigate the shading effect.

FIG. 3 indicates the IFOV from the design eye position in one particular arrangement of the form illustrated in FIG. 1, the double crossed matched areas indicating the increase in IFOV when the elements 25a, 25b are in their operative position. In this arrangement the azimuth field of view is increased from 20° to 25° and the elevation IFOV is 15°, the full circle indicating the total field of view (TFOV) of the display.

I claim:

1. A display unit for a head-up display system comprising a projector having an optical element defining its exit pupil, at least one periscopic arrangement and a combiner, the projector projecting light representing a display onto the combiner for reflection thereby to provide an observer with an image of the display superimposed on his view of the distant scene viewed by transmission through the combiner, each periscopic arrangement comprising a first reflective element and a second element parallel to said first reflective element possessing both light transmissive and light reflective properties, each periscopic arrangement being positioned adjacent to the optical element such that projected light from lateral portions of the exit pupil which would not otherwise be received by the observer without lateral head movement is transmitted to the appropriate portion of the combiner by successive reflections of said light at the said second element and the said first element.

2. A display unit according to claim 1 in which said elements are crescent shaped.

3. A display unit according to claim 1 or claim 2 in which said second element is movable between an operative position and an inoperative position.

4. A display unit according to claim 1 in which two periscopic arrangements are provided on opposite sides of said optical element defining the exit pupil.

5. A display unit according to claim 1 in which diffractive optics coatings are employed on optical surfaces of the display unit to mitigate shading effects introduced by the or each periscopic arrangement.

* * * * *